United States Patent
Toomey

(10) Patent No.: US 7,904,531 B2
(45) Date of Patent: *Mar. 8, 2011

(54) METHOD FOR FLEXIBLE, SAFE, ROBUST, AND EFFICIENT GENERATION AND SERVING OF MULTI-SOURCE WORLD-WIDE WEB CONTENT PAGES

(75) Inventor: Christopher Newell Toomey, Cupertino, CA (US)

(73) Assignee: AOL Inc., Dulles, VA (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/249,233

(22) Filed: Oct. 10, 2008

(65) Prior Publication Data

US 2009/0094510 A1    Apr. 9, 2009

Related U.S. Application Data

(63) Continuation of application No. 10/358,762, filed on Feb. 4, 2003, now Pat. No. 7,447,747.

(51) Int. Cl.
G06F 15/16 (2006.01)

(52) U.S. Cl. ......... 709/217; 709/200; 709/219; 709/233; 705/10; 705/51; 715/200; 715/204; 713/161

(58) Field of Classification Search .......... 709/217
See application file for complete search history.

(56) References Cited

U.S. PATENT DOCUMENTS

| | | |
|---|---|---|
| 5,860,073 A | 1/1999 | Ferrel et al. |
| 5,878,421 A | 3/1999 | Ferrel et al. |
| 5,907,704 A | 5/1999 | Gudmundson et al. |
| 5,907,837 A | 5/1999 | Ferrel et al. |
| 5,999,179 A | 12/1999 | Kekic et al. |
| 6,128,655 A | 10/2000 | Fields et al. |
| 6,141,666 A * | 10/2000 | Tobin .................... 715/207 |
| 6,151,584 A | 11/2000 | Papierniak et al. |
| 6,199,082 B1 | 3/2001 | Ferrel et al. |
| 6,289,382 B1 | 9/2001 | Bowman-Amuah |
| 6,327,574 B1 | 12/2001 | Kramer et al. |
| 6,336,137 B1 | 1/2002 | Lee et al. |
| 6,370,573 B1 | 4/2002 | Bowman-Amuah |
| 6,605,120 B1 | 8/2003 | Fields et al. |

(Continued)

FOREIGN PATENT DOCUMENTS

EP 1107137 6/2001

(Continued)

OTHER PUBLICATIONS

Chahuneau, F.; Guennou, S.; Blavier, A.; *SGML Template Driven Database Extraction: A New Approach to Report Generation*; SGML Europe '97. Conference Proceedings May 1997; published 1996.

(Continued)

*Primary Examiner* — Kevin Bates
*Assistant Examiner* — Arvin Eskandarnia
(74) *Attorney, Agent, or Firm* — Michael A. Glenn; Glenn Patent Group

(57) ABSTRACT

The invention provides a method for flexibly, safely, robustly, and efficiently serving user interface pages composed of foreign content supplied by a third-party as well as local content supplied by the first party by allowing the cobrander to serve cobranded page templates. The cobrandee server retrieves the cobranded page templates from cobrander server and inserts the cobrandee contents into the cobranded page templates to generate cobranded Web content pages.

19 Claims, 6 Drawing Sheets

U.S. PATENT DOCUMENTS

| | | | |
|---|---|---|---|
| 6,606,744 B1* | 8/2003 | Mikurak | 717/174 |
| 2001/0042089 A1* | 11/2001 | Tobin | 709/1 |
| 2002/0059369 A1* | 5/2002 | Kern et al. | 709/203 |
| 2002/0161625 A1* | 10/2002 | Brito-Valladares et al. | 705/10 |
| 2003/0004998 A1* | 1/2003 | Datta | 707/513 |
| 2003/0037236 A1* | 2/2003 | Simon et al. | 713/161 |
| 2003/0050855 A1 | 3/2003 | Jaffe et al. | |
| 2003/0167234 A1* | 9/2003 | Bodmer et al. | 705/51 |
| 2003/0191812 A1 | 10/2003 | Agarwalla et al. | |

FOREIGN PATENT DOCUMENTS

| | | |
|---|---|---|
| EP | 1156415 | 11/2001 |
| EP | 1156427 | 11/2001 |
| EP | 1156429 | 11/2001 |
| EP | 1251438 | 10/2002 |

OTHER PUBLICATIONS

Douglis, F.; Haro, A.; Rabinovich, M.; *HPP: HTML Macro-Preprocessing To Support Dynamic Document Caching*; Proceedings of the USENIX Symposium on Internet Technologies and Systems; Dec. 1997.

Reppert, P.; *A Template Generator For HTML Documents. Creating Pages With Common Elements*; WEB Techniques; Nov. 1996.

F. Douglis, A. Haro, M. Rabinovich; *HPP: HTML Macro-Preprocessing to Support Dynamic Document Caching*; USENIX Symposium on Internetworking Technologies and Systems; Dec. 1997.

Fernandez, M., D. Florescu, J. Kang, A. Levy, D. Suciu; *Catching the Boat with Strudel: Experiences with a Web-Site Management System*; AT&T Labs; mff,dana,kang,levy,suciu@research.att.com; Nov. 1997.

*Mapquest: Basic Maps & Driving Directions For Your Web Site*; www.mapquest.com/business.

S.G. Loeber, L.M. Aroyo, L. Hardman; *An Explicit Model for Tailor-Made eCommerce Web Presentations*; May 2002; Workshop on Recommendation and Personalization in eCommerce; Malaga, Spain.

L. Ardissono, A. Goy; *Tailoring the Interaction with Users in Web Stores*; User Modeling and User-Adapted Interaction, 2001.

R. Goldman, J. Widom; *DataGuides: Enabling Query Formulation and Optimization in Semistructured Databases*; Aug. 1997; Proceedings of the 23rd VLDB Conference; Athens, Greece.

D. Hoffman, T. Novak; *Marketing in Hypermedia Computer-Mediated Environments: Conceptual Foundations*; Working Paper No. 1 (revised Jul. 11, 1995); http://www2000.ogsm.vanderbilt.edu.

Hwee-Leng Ong; Ah-Hwee Tan; Ng, J.; Hong Pan; Qiu-Xiang Li; *Organizing And Personalizing Intelligence Gathering From The Web*; International Journal of Intelligent Systems in Accounting, Finance and Management; Jan.-Mar. 2002.

Abidi, Syed Sibte Raza, et al.; *An Intelligent Info-Structure For Composing And Pushing Personalised Healthcare Information Over The Internet*; Jul. 2001; Proceedings 14th IEEE Symposium on Computer-Based Medical Systems. CBMS 2001.

Dunstan, et al.; *A Cluster-Based Geophysical Template Matching System*; Jan. 29-Feb. 4, 2001; Proceedings 24th Australian Computer Science Conference; 2001.

Haji-Ismail, et al.; *JACIE-An Authoring Language For Rapid Prototyping Net-Centric, Multimedia And Collaborative Applications*; Dec. 2000; Proceedings International Symposium on Multimedia Software Engineering; 2000.

Latchem, S.;*Patterns For Internet Development. Providing A Component Based Technical Architecture For Internet Solutions*; Jun. 2000; Proceedings of the Conference on Application Development 2000, London, UK.

Kolesnikov, A.; Kauranne, T.; Marsh, A.; *Integrating DICOM Medical Images into Virtual Medical Worlds*; Apr. 1999; Conference Proceedings IT IS-ITAB '99. Joint Meeting. Second International Workshop On the Telemedical Information Society (IT IS '99)/Second IEEE EMBS International Workshop on Information Technology Applications in Biomedicine (ITAB '99), Amsterdam, Netherlands.

Collins, W.J.; Yi Sun; *Web Labs For The Standard Template Library And The Java Generic Library In A CS2 Course*; Mar. 1999; Thirtieth SIGCSE Technical Symposium on Computer Science Education; New Orleans, LA USA.

Haga, H.; *Synchronisation Of On-Line And Off-Line Teaching Material In Distance Education*; Feb. 1997; Proceedings of the Fifteenth IASTED International Conference. Applied Informatics; 1997; Innsbruck, Austria.

Godby, M.; *Electronic Commerce On The Web—Better Forms Mean Better Functions*; Nov. 1997; Inform, vol. 11, No. 10.

Hammer, J.; Garcia-Molina, H.; Nestorov, S.; Yerneni, R.; Breunig, M.; Vassalos, V.; *Template-Based Wrappers in the TSIMMIS System*; May 1997; ACM SIGMOD Intl Conf. on Management of Data; Tucson AZ, USA.

A. Kobsa, J. Koenemann, W. Pohl; *Personalized Hypermedia Presentation Techniques for Improving Online Customer Relationships*; 2001; The Knowledge Engineering Review, vol. 16.

Mapquest: Product Overview; retrieved May 29, 2008 from website: http://www.mapquest.com/solutions/product.adp.

Mapquest: About Mapquest; retrieved May 29, 2008 from website: http://www.mapquest.com/about/main.adp.

Wills, et al.; *Studying the Impact of More Complete Server Information on Web Caching*; May 2000; In Proceedings of the 5th Int'l Web Caching and Content Delivery Workshop; Libson, Portugal.

\* cited by examiner

METHOD FOR FLEXIBLE, SAFE, ROBUST, AND EFFICIENT GENERATION AND SERVING OF MULTI-SOURCE WORLD-WIDE WEB CONTENT PAGES

CROSS-REFERENCE TO RELATED APPLICATIONS

This application is a Continuation of U.S. patent application Ser. No. 10/358,762 filed 4 Feb. 2003, now U.S. Pat. No. 7,447,747 which is incorporated by reference.

BACKGROUND OF THE INVENTION

1. Technical Field

This invention relates generally to generation of Internet content. More particularly, the invention relates to a method for flexibly, safely, robustly, and efficiently serving user interface pages composed of foreign content supplied by a third-party as well as local content supplied by a first party.

2. Description of the Prior Art

Presently, the Internet has established itself a main force of information communication and the world-wide Web has added new roles besides its originate purpose of sharing information. One of the new roles is to carry e-commerce, where commercial transactions are performed electronically through the world-wide Web over the Internet. The Web contents have also evolved from simple static Web pages written in Hyper Text Markup Language (HTML) to dynamically generated Web pages via Web applications. Conducting e-commerce over the Web is enabled by the Web applications that allow end users to interact with the server that hosts the Web applications. Forms are often inserted to HTML pages to capture the input requests of the end user, and a server site application processes the requests, generates responses and returns responses, again in the format of HTML, to the end user.

However, the dynamic contents often require special development team to generate and maintain. Depending on the complexity of the content, it could also take quite long time to make the dynamic content available to the on-line community. Sometime it may be convenient and financially plausible to use Web contents and applications developed. As the requirement grows, more organizations are providing dynamic contents that other organizations can share and present to their own users. These dynamic contents may provide essential features such as user registration and authentication, or provide additional contents to be added to other organizations' own Web contents. These dynamic contents are often required be cobrandable, i.e. it should allow them to be configured to carry the logos or other brand content of parties which use them to present an impression of proprietary content to their own user.

The provider of the cobrandable dynamic Web contents is herein called a cobrandee and the party that uses the cobrandee's Web contents is herein called a cobrander. The Web content page that contains both the cobrandee's contents and the cobrander's contents is herein called a cobranded Web content page. The cobrander's contents are herein all called cobranding contents.

When serving cobranded Web content pages, the provider of the cobrandable content provides the primary content, such as a news story, a network login form, etc. and other organization provides secondary cobranding content, such as a brand image and brand-specific Web site navigation elements.

The usual method for implementing cobranded pages is for the cobrandable-content-offering organization, the cobrandee, to define the overall page structure and layout, including predefining specific page locations into which categories of cobranding content are to be inserted. For example, the cobrandee may predefine a fixed-size spot for a cobrand image and another for some cobranding messaging. Then the cobranding organization, i.e. the cobrander, provides the contents for these cobranding locations. However, this approach is often unattractive to the cobrander because it typically would like to have full control over the page layout and structure.

What is desired is a technique for flexible, safe, robust, and efficient generation and serving of cobranded Web content pages. The technique should enable the cobrander to control the overall page structure and layout, provide context-sensitive cobrander contents, and control where the cobrandee's contents appears in the cobranded Web content pages. At the same time, the technique should enable the cobrandee to inspect the cobrander's contents and reject them if they violate the cobrandee's rules for allowable content, efficiently and robustly generate the completed cobranded Web content pages, and deliver the completed page to the end user.

SUMMARY OF THE INVENTION

This invention addresses the foregoing and other shortcomings of conventional methods for implementing cobranded pages by allowing the cobrander to serve cobranded page templates. The cobrandee server retrieves the cobranded page templates from cobrander server and inserts the cobrandee contents to the cobranded page templates to generate cobranded Web content pages.

In one embodiment, it is disclosed a system for generating cobranded Web content pages. The system comprises a cobrandee server which provides cobrandable cobrandee contents; and a cobrander server which provides cobranding cobrander contents; wherein the cobrander server controls the overall page structure and layout of the cobranded Web content pages.

In another embodiment, a method is disclosed for providing cobranded Web content pages to an end user. The method comprises the steps of:

(1) the end user requesting a cobranded Web content page from a cobrandee server which provides cobrandable cobrandee contents;

(2) the cobrandee server requesting a cobranded page template from a cobrander server which provides cobranding cobrander contents;

(3) the cobrander server generating the cobranded page template and returning the cobranded page template to the cobrandee server;

(4) the cobrandee server receiving the cobranded page template and checking that the cobranded page template doesn't violate any of a plurality of rules for allowable content;

(5) the cobrandee server inserting the cobrandable contents into the cobranded page template to generate the cobranded Web content page; and (6) the cobrandee server returning the cobranded Web content page to the end user.

In another embodiment, a method is disclosed for providing cobranded Web content pages to an end user. In this embodiment, the cobranded page template retrieved from the cobrander server may be store in a page template cache.

In another embodiment, a system is disclosed for generating cobranded Web content pages. The system comprises:

a cobrandee server which provides cobrandable cobrandee contents; and a cobrander server which provides cobranding cobrander contents;

wherein the cobrandee further comprising:

a retrieving module to retrieve a cobranded page template from the cobrander server;

a validating module to check that the cobranded page template doesn't violate any of a plurality of rules for allowable content; and a generating means to generate the cobranded Web content page by inserting the cobrandable contents to the cobranded page template;

and wherein the cobrander server further comprising a template generating module to generate the cobranded page template.

DETAILED DESCRIPTION OF THE INVENTION

Figure 1:
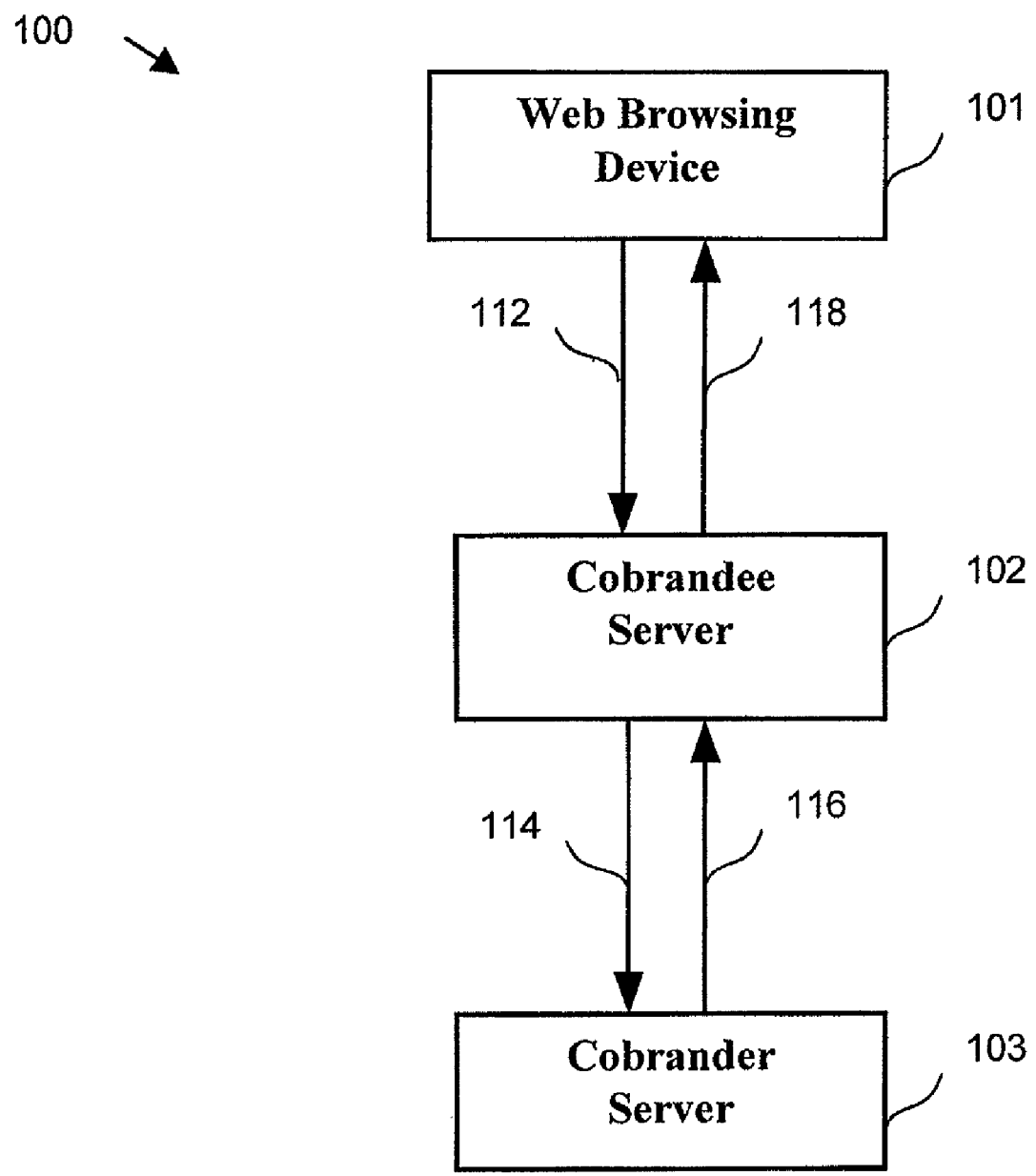
FIG. 1 is a simplified diagrammatic view of a system for generating cobranded Web content pages according to the invention.

Turning now to the drawings, FIG. 1 is a simplified diagrammatic view of a system 100 for generating cobranded Web content pages according to one embodiment of the invention. The system primarily comprises a Web browsing device 101 which an end user uses to browsing online contents, a cobrandee server 102 which provides contents which are cobrandable, and a cobrander server which provides cobranding contents 103.

Conventionally, a user opens the Web browsing device 101 and browses to 112 a URL hosted by the cobrandee server 102, possible navigating from a site provided by the cobrander server. Upon receiving the user's request, the cobrandee server 102 invokes a retrieving module to retrieve 114 a cobranded page template from the cobrander server 103. The cobrander server comprises a page template generating module to generate the cobranded page template and returns 116 the cobranded page template to the cobrandee server 102. The cobrandee server 102 then uses a validating module to check whether the cobranded page template violates any of the rules for allowable content. If the cobranded page template does not violate any of the rules for allowable content, the cobrandee server uses a generating module to generate the cobranded Web content page by inserting cobrandee's cobrandable contents to the cobranded page template and returns 118 to the Web browsing device where it is presented to the end user.

Figure 2:
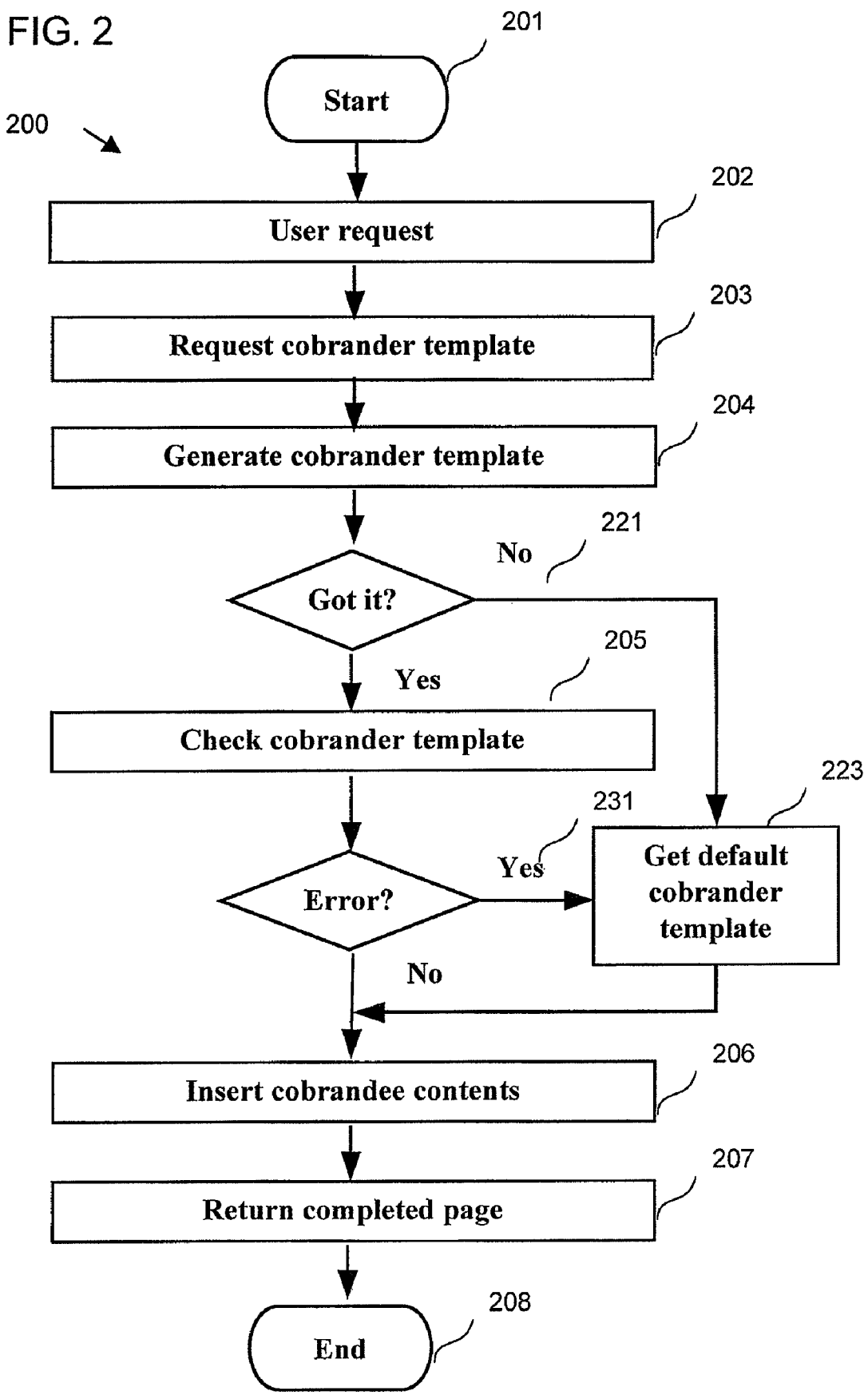
FIG. 2 is a simplified diagrammatic view of a method for generating cobranded Web content pages according to the invention.

FIG. 2 is a simplified diagrammatic view of a method 200 for generating cobranded Web content pages according to one embodiment of the invention. The method starts at 201. In step 202, the end user requests a cobranded Web content page from the cobrandee server 102. The requests typically come when a user follows a link on a Web page which is served by the cobrander server by a navigating means in the Web browsing device 101. After receiving the request, the cobrandee server analyzes the content of the request, such as the Web page, the user, the state of the browsing session.

In step 203, the cobrandee server requests a suitable cobrandee page template from the cobrander server while passing along the context values. The URL of the cobrandee page template has been provided to the cobrandee and available to the cobrander server. The cobrander may also configure which contexts of the request to be passed along when the cobrandee server is requesting the cobranded page templates.

In step 204, the cobrander server processes the request from the cobrandee server and returns the cobranded page template. The cobrander server can return a cobranded page template which is special to the set of received content of request of the end user.

The cobrandee server may fail to retrieve a cobranded page template from the cobrander server 221. This could be either because the cobrander chooses not to provide cobranded page templates at all, or because the cobrander server fails to return a cobranded Web page template. In either case, the cobrandee server uses a default page template 231, and the flow continues to step 206. The cobrandee provides the default page template for the cobrander as a fallback to handle these cases. The default template may be configured by cobrander to include limited cobrander contents such as the cobrander's logo, display name, and benefit statements.

In step 205, the cobrandee server receives the cobranded page template and checks that it does not violate any of the rules for allowable content. For example, one of the rules for allowable content may be that the page template does not content JavaScript code. Another rule may be that the page template should not contain the HTML tag FRAME. The cobrandee server performs the check to ensure the page security and robust generation of cobranded Web content pages. If the cobranded page template passes the check, the cobrandee server then moves on to step 206.

In step 206, the cobrandee server inserts cobrandee contents to the cobranded page template. In one typical implementation, the cobrandee server may require the cobranded page template comprise special tags, which are used to specify locations where the cobrandee contents is to be inserted. In this implementation, the cobrandee server replaces the special tags in the cobranded page template with corresponding cobrandee contents. The cobrander may also supply configuration parameters to the cobrandee to control the visual effects of the cobrandee contents which are to be inserted into the cobranded page template. Using these configuration parameters, the cobrander is able to make sure that the cobrandee contents match the look-and-feel of the pages served by the cobrander server. If such configuration parameters have been provided and available to the cobrandee server, the cobrandee server then renders the cobrandee contents according to the configuration parameters.

The returned cobranded Web page may violate any the rules for allowable content 231. In this case, the default page template is used 223, and the flow continues to step 207.

In step 207, the cobrandee server returns the completed cobranded Web content page to the Web browsing device 101 where it is to be presented to the end user. The method ends at 208.

Figure 3:
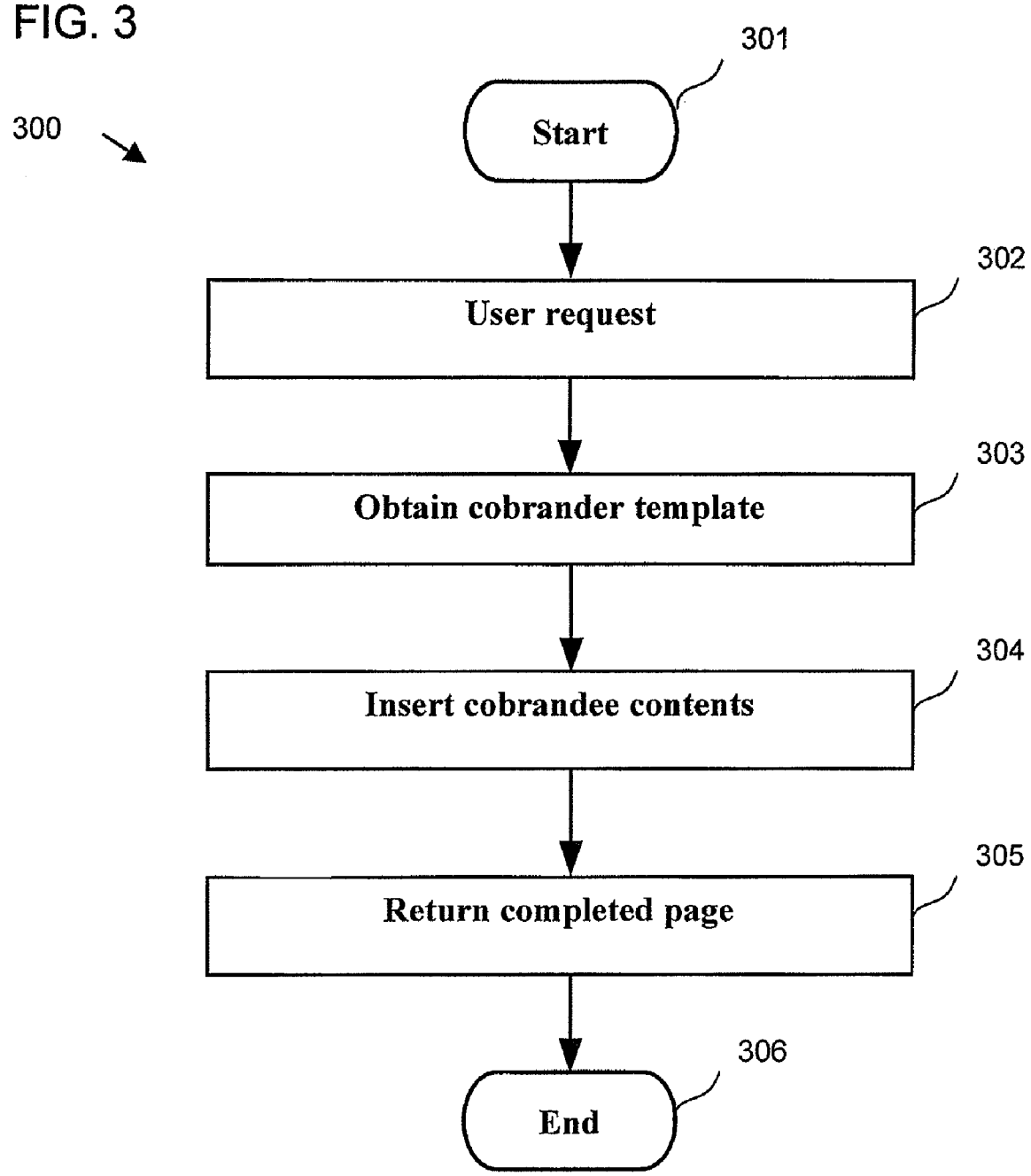
FIG. 3 is a simplified diagrammatic view of a method for generating cobranded Web content pages according to the invention.

FIG. 3 is a simplified diagrammatic view of a method 300 for generating cobranded Web content pages according to another embodiment of the invention. In this embodiment, the cobrandee server 102 has a memory cache to store cobranded page templates which are received from the cobrander server. By caching the cobranded page templates, the cobrandee server only retrieves a new cobranded page template when there are no cached page templates for the context of the request of the end user, or the cached page template that matches the context of the request of end user has expired. The implementation of page template caching not only reduces page generation time so that the end user spends less time on waiting the cobranded Web content page to return, but lessens the load of the cobrander server that is responsible for generating cobranded page templates and the cobrandee server that is responsible for fetching and checking the cobranded page templates.

Method 300 starts at 301. In step 302, the end user requests a cobranded Web content page from the cobrandee server 102. The requests typically come when a user follows a link on a Web page which is served by the cobrander server by a navigating means in the Web browsing device 101. After receiving the request, the cobrandee server analyzes the content of the request, such as the Web page, the user, the state of the browsing session.

In step 303, the cobrandee server obtains a suitable cobrandee page template. The cobrandee server first tries to find a cobranded page template from the page template cache and request from the cobrander server if no valid page template is found. Details of this step are described below as illustrated in FIG. 4.

In step 304, the cobrandee server inserts cobrandee contents to the cobranded page template. In one typical implementation, the cobrandee server may require the cobranded page template comprise special tags, which are used to specify locations where the cobrandee contents is to be inserted. In this implementation, the cobrandee server replaces the special tags in the cobranded page template with corresponding cobrandee contents. The cobrander may also supply configuration parameters to the cobrandee to control the visual effects of the cobrandee contents which are to be inserted into the cobranded page template. Using these configuration parameters, the cobrander is able to make sure that the cobrandee contents match with the look-and-feel of the pages served by the cobrander server. If such configuration parameters have been provided and available to the cobrandee server, the cobrandee server then renders the cobrandee contents according the configuration parameters.

In step 305, the cobrandee server returns the completed cobranded Web content page to the Web browsing device 101 where it is to be presented to the end user. The method ends at 306.

Figure 4:
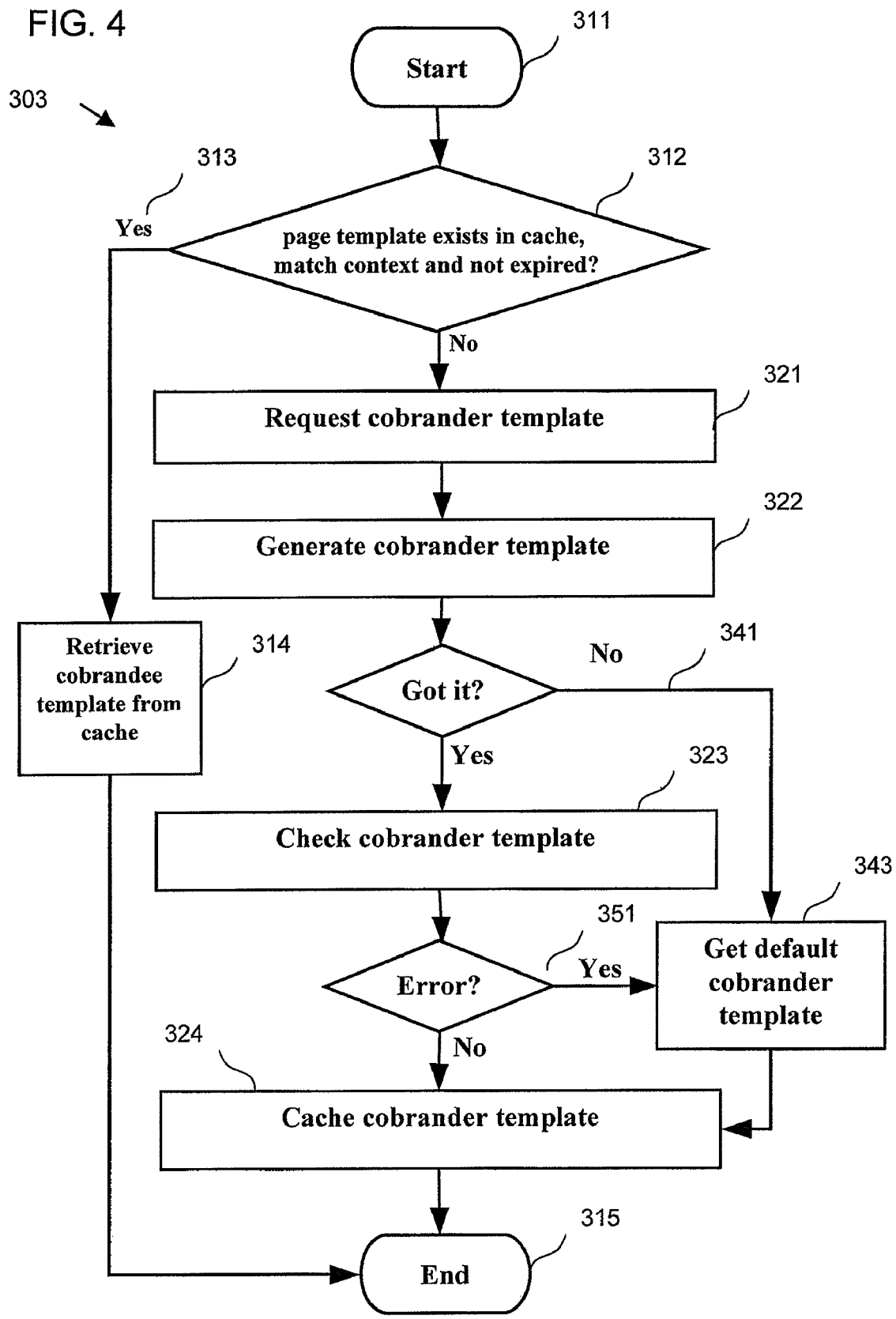
FIG. 4 is a simplified diagrammatic view of detailed substeps of the method shown in FIG. 3.

FIG. 4 is a simplified diagrammatic view of the detailed sub-steps of step 303 in method 300. The flow steps at 311. In step 312, the cobrandee server checks whether there is a cobranded page template in the page template cache that matches the context of the request of the end user. If a cobranded page template is found, the cobrandee server also checks whether the cobranded page template is unexpired.

In step 313, a cobranded page template is found in the page template cache. The cobranded page template matches the context of the request of the end user and is unexpired. In step 314, the cobranded page template is retrieved from the page template cache. This cobranded page template is to be used in step 304 to generate a cobranded Web content page.

If no cobranded page template can be retrieved from the page template cache, the flow then continues to step 321. In step 321, the cobrandee server requests a suitable cobrandee page template from the cobrander server while passing along the context values. The URL of the cobrandee page template has been provided to the cobrandee and available to the cobrandee server. The cobrander may also configure which contexts of the request to be passed along when the cobrandee server is requesting the cobranded page templates.

In step 322, the cobrander server processes the request from the cobrandee server and returns the cobranded page template. The cobrander server can return a cobranded page template which is special to the content of the request of the end user.

Again, the cobrandee server may fail to retrieve a cobranded page template from the cobrander server 341. This could be either because the cobrander chooses not to provide cobranded page templates at all, or because the cobrander server fails to return a cobranded Web page template. In either case, the cobrandee server uses the default page template 343, and the flow continues to step 324.

In step 323, the cobrandee server receives the cobranded page template and checks that it does not violate any of the rules for allowable content. For example, one of the rules for allowable content may be that the page template does not content JavaScript code. Another rule may be that the page template should not contain the HTML tag FRAME. The cobrandee server performs the check to ensure the page security and robust generation of cobranded Web content pages. If the cobranded page template passes the check, the cobrandee server then moves on to step 324.

The returned cobranded Web page may violate any the rules for allowable content 351. In this case, the default page template is used 343, and the flow continues to step 324.

In step 324, the cobrandee server evaluates heuristics to determine whether the newly retrieved cobranded page template is to be stored in the page template cache. If so, store the cobranded page template in the page template cache. The newly retrieved cobranded page template is also used in step 314 to generate a cobranded Web content page. The flow ends at 315.

The cobrander may provide a timeout value configuration parameter to control when cobranded page template stored in the page template cache expires. If such a configuration parameter is not provided, then a default timeout value is used when determine whether a cached cobranded page template is expired.

Figure 5:
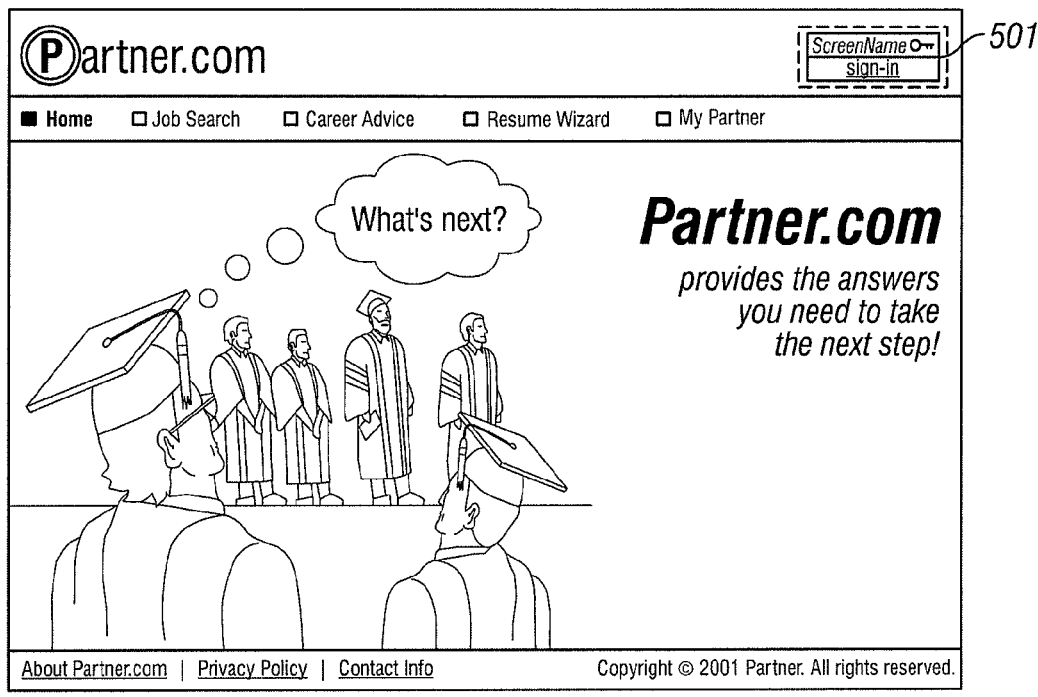
FIG. 5 is a simplified view of a web page served by the cobrander server and displaying to the end user through the web browsing device.

FIG. 5 is a simplified view of a web page served by the cobrander server and displaying to the end user through the web browsing device 101. The web page contains a link 501, as shown in the rectangle in dash lines, to a cobranded web content page served cobrandee server. After the user clicks on the link, a cobranded web content page is generated by the cobrandee server and returned.

Figure 6:
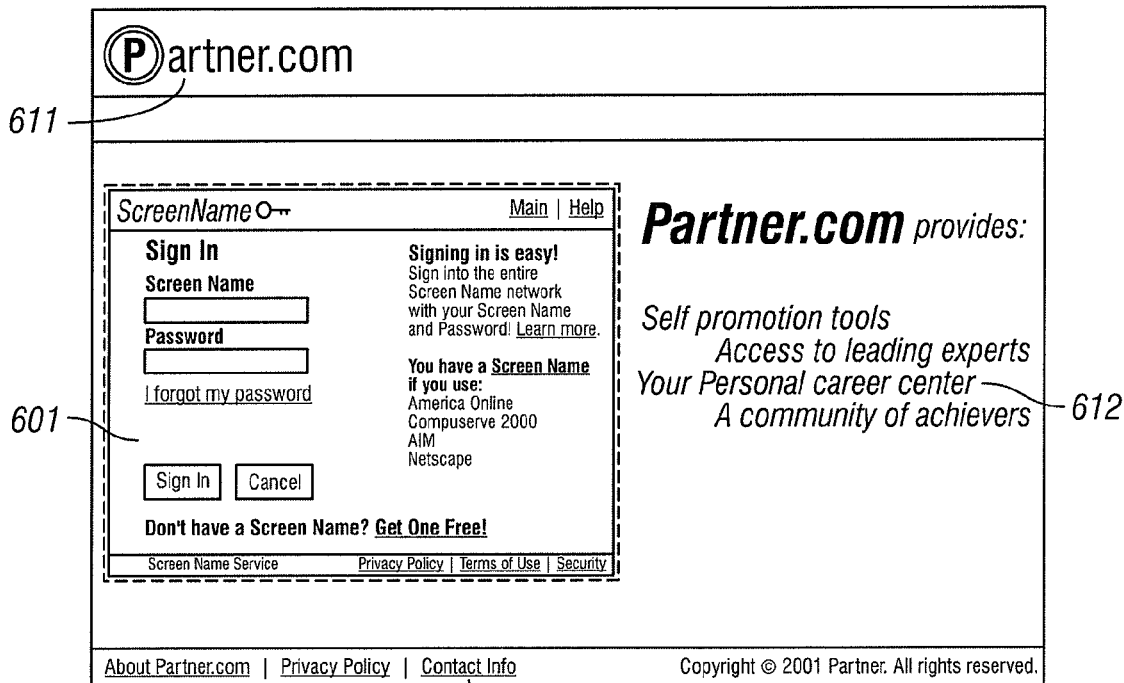
FIG. 6 is a simplified view of a cobranded Web content page generated by the cobrandee server using a retrieved cobranded page template from the cobrander server according to one embodiment of the invention.

FIG. 6 is a simplified view of a cobranded Web content page generated by the cobrandee server 102 using a retrieved cobranded page template from the cobrander server 103 according to one embodiment of the invention. The cobranded Web content page contains cobrandee contents 601, as shown in the rectangle in dash lines, and cobrander contents such as cobrander's logo image 611, cobrander's benefit statements 612 and cobrander's navigation links 613. Because the cobrander contents are generated in the cobranded page template served by the cobrander server, the cobrander enjoys the flexibility to change the cobrander contents, such as 611, 612, 613, in the cobrander Web content pages. The cobrander can also control layout of the cobrander Web content page, change the location of the cobrandee contents 601 on the cobranded Web content page. Further, by supplier configuration parameters to the cobrandee server, the cobrander will be able to control the visual effects of the cobrandee contents 601 so that cobrandee contents may be rendered to match the visual effects of the cobrander contents.

As described above, a default cobrander template is also provided for the cobrander by the cobrandee. The default template will be used as a fallback template in case that the cobrandee server fails to retrieve a cobranded page template from the cobrander server of the retrieved cobranded page template violates any of the rules for allowable contents.

Figure 7:
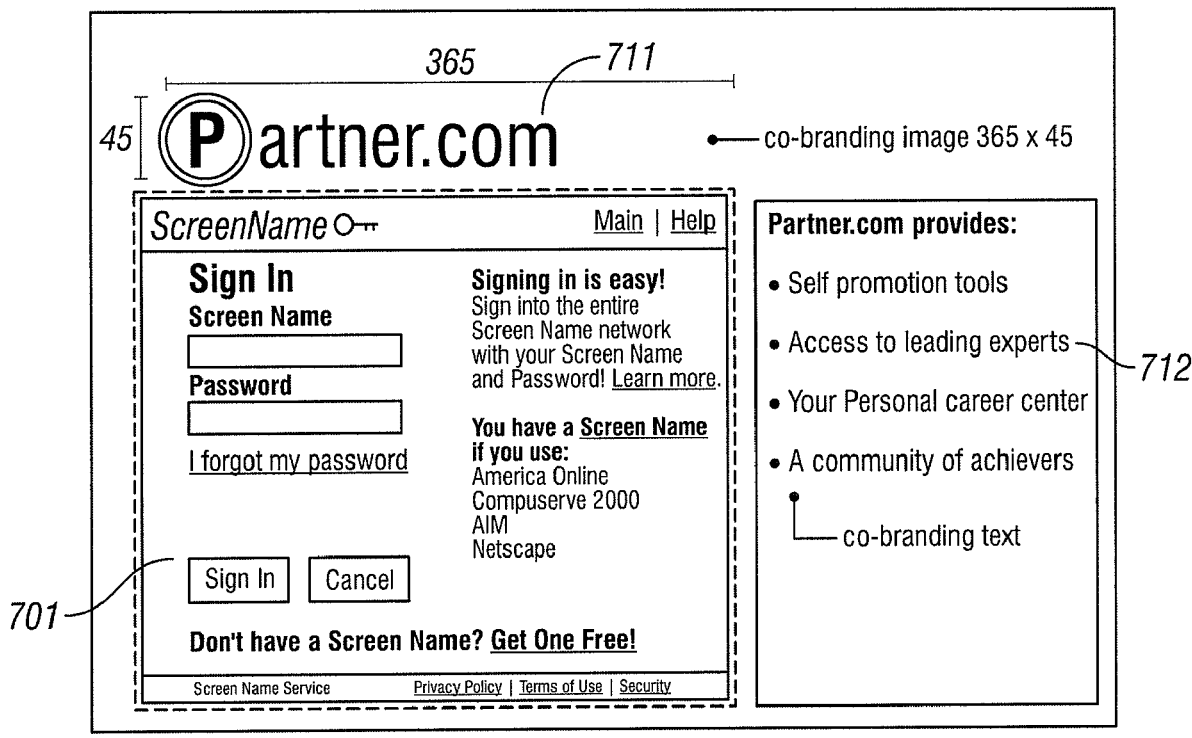
FIG. 7 is a simplified view of a cobranded Web content page generated by the cobrandee server using a default cobrander template according to one embodiment of the invention.

FIG. 7 is a simplified view of a cobranded Web content page generated by the cobrandee server 102 using a default cobrander template according to one embodiment of the invention. The cobranded Web content page contains cobrandee contents 701, as shown in the rectangle in dash lines, and cobrander contents such as cobrander's logo image 711 and cobrander's benefit statements 712.

Therefore, this invention, as illustrated in above embodiments, provides a technique for flexible, safe, robust, and efficient generation and serving of multi-source world-wide Web content pages such as cobranded pages. The technique presented herein greatly improves the degree of page control for the cobrander, while preserving the cobrandee's ability to server the pages to the end user in a secure and efficient way. In particular, the method enables the cobrander to:

control the overall page structure and layout;
provide context-sensitive cobrander content in the page;
control where the cobrandee's content appears in the page;
control aspects of the visual rendering of the cobrandee's content, such as foreground and background colors; and
influence the duration for which the cobrander-supplied page templates, which comprise essentially the page minus the cobrander's content, are cached.

At the same time, it enables the cobrandee to:

inspect the cobrander's content and reject it if it violates the cobrandee's rules for what is allowable, such as Javascript content in an HTML page;
efficiently and robustly generate the completed cobranded pages; and
deliver the completed page to the end user.

From the foregoing, it can be seen that a system designed in accordance with the this invention provides a versatile, efficient, and personalized Internet interface for specialized applications, particularly with respect to automating certain interactions which ordinarily must be completed manually. The preferred embodiments disclosed herein have been described and illustrated by way of example only, and not by way of limitation. Other modifications and variations to the invention will be apparent to those skilled in the art from the foregoing detailed disclosure. While only certain embodiments of the invention have been specifically described herein, it will be apparent that numerous modifications may be made thereto without departing from the spirit and scope of the invention.

Accordingly, the invention should only be limited by the Claims included below.

The invention claimed is:

1. A system for generating cobranded Web pages, comprising:

a cobrandee server which provides cobrandable contents; and
at least one cobrander server which provides cobranding contents and at least one cobranded page template;
wherein said at least one cobrander server controls the overall page structure and layout of said cobranded Web pages;
wherein said cobrandee server determines whether said cobranding contents and said cobranded page template violate at least one rule for allowable contents from said at least one cobrander server;
wherein said cobrandee server rejects any of said cobranding contents and said cobranded page template from said at least one cobrander server that violate said at least one rule for allowable contents from said at least one cobrander server;
wherein if said cobranded page template does violate any of said at least one rule for allowable contents from said at least one cobrander server, said cobrandee server provides a default page template and inserts said cobrandable contents and said cobranding contents into said default page template to generate one or more of said cobranded Web pages;
wherein said cobrandee server accepts any of said cobranding contents and said cobranded page template from said at least one cobrander server that do not violate said at least one rule for allowable contents from said at least one cobrander server;
wherein said cobranding contents that are accepted are deemed to be allowable cobranding contents; and
wherein said cobrandee server generates one or more of said cobranded Web pages comprising said cobranded page template as accepted, said cobrandable contents from said cobrandee server, and said allowable cobranding contents from said at least one cobrander server.

2. The system of claim 1, wherein said at least one cobrander server supplies a timeout value to said cobrandee server to control when said cobranded page template stored in a page template cache expires.

3. The system of claim 2, wherein if said at least one cobrander server does not supply said timeout value, a default timeout value is used to determine when said cobranded page template cached is expired.

4. The system of claim 1, wherein said cobrandee server robustly generates said cobranded Web pages.

5. A method for providing cobranded Web pages to an end user, comprising the steps of:

a cobrandee server receiving a request from said end user for a cobranded Web content page;
said cobrandee server providing cobrandable contents;
said cobrandee server obtaining a cobranded page template from a cobrander server;
said cobrandee server receiving cobranding contents from said cobrander server;
said cobrandee server determining whether said cobranding contents and said cobranded page template violate any of at least one cobrandee rule for allowable cobranding contents from said cobrander server;
responsive to determining that said cobranding contents and said cobranded page template do not violate any of said at least one cobrandee rule for allowable cobranding contents from said cobrander server, said cobrandee server inserting said cobrandable contents and said cobranding contents into said cobranded page template to generate said cobranded Web content page;
responsive to determining that said cobranded page template received does violate any of said at least one cobrandee rule for allowable cobranding contents from said cobrander server, said cobrandee server provides a default page template and inserts said cobrandable contents and said cobranding contents into said default page template to generate said cobranded Web content page; and said cobrandee server returning said cobranded Web content page to said end user.

6. The method of claim 5, wherein said cobrander server supplies a timeout value to said cobrandee server to control when said cobranded page template stored in a page template cache expires.

7. The method of claim 6, wherein if said cobrander server does not supply said timeout value, a default timeout value is used to determine when said cobranded page template cached is expired.

8. The method of claim 5, wherein said step of said cobrandee server obtaining said cobranded page template further comprises the steps of:

checking whether said cobranded page template exists in said page template cache, matches a context of said request of said end user, and is unexpired; and retrieving said cobranded page template from said page template cache if said cobranded page template exists, matches said context of said request of said end user and is unexpired.

9. The method of claim 8, wherein said step of said cobrandee server obtaining said cobranded page template further comprises the sub-steps of:

said cobrandee server requesting said cobranded page template from said cobrander server which provides said cobranding contents when said cobranded page template does not exit in said page template cache, or does not match said context of said request of said end user, or said cobranded page template has expired;

said cobrander server generating said cobranded page template and returning said cobranded page template to said cobrandee server;

said cobrandee server receiving said cobranded page template and checking that said cobranded page template does not violate any of said at least one cobrandee rule for allowable cobranding contents from said cobrander server;

said cobrandee server evaluating heuristics to determine whether said cobranded page template needs to be stored in said page template cache; and storing said cobranded page template to said page template cache if said cobranded page template needs to be stored.

10. The method of claim 5 wherein said cobrander server supplies configuration parameters to said cobrander server to control visual effects of said cobrandable contents of said cobrandee server.

11. The method of claim 5, wherein said cobrandee server uses a default page template when said cobrander server fails to return said cobranded page template.

12. In a system for generating a cobranded Web page, comprising a cobrander server which provides cobranding cobrander content, a cobrandee server which provides cobrandable content, said cobrandee server comprising:

a retrieving module to retrieve a cobranded page template and said cobranding content from said cobrander server;

a validating module to determine whether said cobranded page template and said cobranding content violate any of at least one rule for allowable content from another party;

a generating means to generate said cobranded Web page by inserting said cobrandable content and said cobranding content into said cobranded page template, responsive to determining that said cobranded page template and said cobranding content do not violate any of said at least one rule for allowable content from another party; and wherein responsive to determining that said cobranded page template does violate any of said at least one rule for allowable content from another party, said cobrandee server provides a default page template and inserts said cobrandable content and said cobranding content into said default page template to generate said cobranded Wed Web page.

13. The system of claim 12, wherein said cobrander server further comprises a template generating module to generate said cobranded page template.

14. The system of claim 13, wherein said cobrander server supplies a timeout value to said cobrandee server to control when said cobranded page template stored in a page template cache expires.

15. The system of claim 14, wherein if said cobrander server does not supply said timeout value, a default timeout value is used to determine when said cobranded page template cached is expired.

16. The system of claim 12, wherein said cobrandee server sends a context of a request of an end user to said cobrander server.

17. The system of claim 13, wherein said cobrander server supplies configuration parameters to said cobrandee server to control visual effects of said cobrandable content of said cobrandee server.

18. The system of claim 12, wherein said cobrandee server uses a default page template when said cobrander server fails to return said cobranded page template.

19. The system of claim 12, wherein said cobranding contents comprise any of:

a logo image;

a display name; and a benefit statement.

* * * * *